US012486151B2

(12) United States Patent
Anyogu et al.

(10) Patent No.: US 12,486,151 B2
(45) Date of Patent: Dec. 2, 2025

(54) MOBILE ELEVATED SURVEILLANCE TOWER

(71) Applicants: Miller Chibueze Anyogu, Locust, NC (US); Brian Anyogu, Locust, NC (US)

(72) Inventors: Miller Chibueze Anyogu, Locust, NC (US); Brian Anyogu, Locust, NC (US)

( * ) Notice: Subject to any disclaimer, the term of this patent is extended or adjusted under 35 U.S.C. 154(b) by 619 days.

(21) Appl. No.: 17/929,844

(22) Filed: Sep. 6, 2022

(65) Prior Publication Data

US 2023/0278841 A1 Sep. 7, 2023

Related U.S. Application Data

(60) Provisional application No. 63/268,773, filed on Mar. 2, 2022.

(51) Int. Cl.
*B66F 11/04* (2006.01)

(52) U.S. Cl.
CPC .................................. *B66F 11/042* (2013.01)

(58) Field of Classification Search
CPC ........ B66F 11/04; B66F 11/042; B66F 11/048
USPC .......................................................... 182/69.5
See application file for complete search history.

(56) References Cited

U.S. PATENT DOCUMENTS

| | | | | | |
|---|---|---|---|---|---|
| 4,719,716 | A | 1/1988 | Chrisley, Jr. | | |
| 6,460,653 | B1 | 10/2002 | Hardy et al. | | |
| 7,014,238 | B2 | 3/2006 | Gonzalez | | |
| 7,168,522 | B1 | 1/2007 | Price | | |
| 7,726,690 | B1 * | 6/2010 | James | B60J 7/165 | 182/69.5 |
| 7,815,015 | B2 | 10/2010 | Kerns | | |
| 8,151,934 | B2 | 4/2012 | Kirby | | |
| 8,505,684 | B1 * | 8/2013 | Bogue | B66F 11/042 | 182/69.5 |
| 8,789,548 | B2 | 7/2014 | Atherton | | |
| 9,832,989 | B2 | 12/2017 | Hillis et al. | | |
| 10,697,193 | B2 | 6/2020 | Tafuro et al. | | |
| 11,198,385 | B2 | 12/2021 | Coulter | | |
| 2004/0045768 | A1 * | 3/2004 | Puszkiewicz | B66F 17/006 | 182/69.5 |
| 2006/0017809 | A1 | 1/2006 | Carroll | | |
| 2008/0307717 | A1 | 12/2008 | Heppner | | |
| 2010/0201813 | A1 | 8/2010 | Monsive, Jr. | | |
| 2013/0163976 | A1 | 6/2013 | Pierce et al. | | |
| 2014/0110190 | A1 * | 4/2014 | Sollers | E04G 1/24 | 182/19 |
| 2017/0081162 | A1 * | 3/2017 | Ahern | B66F 11/042 | |
| 2017/0105405 | A1 | 4/2017 | Decker | | |
| 2017/0156309 | A1 | 6/2017 | Muegerl | | |
| 2020/0317489 | A1 * | 10/2020 | Bhatia | B66F 11/042 | |
| 2020/0317492 | A1 * | 10/2020 | Bhatia | B66F 13/00 | |

* cited by examiner

*Primary Examiner* — Brady W Frazier
(74) *Attorney, Agent, or Firm* — Dunlap Bennett & Ludwig, PLLC

(57) ABSTRACT

A mobile surveillance tower system having a booth connected to a trailer assembly by way of a scissors lift, making the booth movable between a collapsed transportation condition and an extended deployed condition. The mobile surveillance tower system provides stabilizing sensors along the trailer assembly so that the power to the scissor lift is conditioned on the stabilizing sensors identifying even ground for stabilizing jacks operatively associated with the trailer assembly. The stabilizing jacks may have their own stabilizing jack sensors for further conditioning power to the scissor lift.

13 Claims, 4 Drawing Sheets

MOBILE ELEVATED SURVEILLANCE TOWER

CROSS-REFERENCE TO RELATED APPLICATION

This application claims the benefit of priority of U.S. provisional application No. 63/268,773, filed 2 Mar. 2022, the contents of which are herein incorporated by reference.

BACKGROUND OF THE INVENTION

The present invention relates to surveillance systems and methods and, more particularly, a mobile elevated surveillance tower.

Given that security threats are unpredictable and may change from situation to situation or even change within one security event or situation, there is a very real need for an elevated surveillance tower that can be rapidly deployed regardless of the security threat and regardless of the security environment.

Yet providing an elevated vantage point during a high threat situation can typically face several challenges. Current surveillance towers utilize a fold-out stabilizer mechanism or a lower rated pullout mechanism during initial deployment to an elevated condition, which tend to have a high-probability of human error that could lead to accidents. Without proper fail-safe features, deployment-related accidents can be fatal.

As can be seen, it would be advantageous for a mobile elevated surveillance tower that obviates the need for in-situ, fold-out deployment, The surveillance tower embodied in the present invention utilizes a suite of sensors and stabilizer jacks to ensure safe deployment to the elevated condition. The pullout stabilizer mechanisms operatively associated with the present invention are coupled with sensors and are rated at over 40 thousand pounds (combined).

The combination of the above-mentioned safety features in the surveillance tower of the present invention makes it nearly impossible to unsafely raise the tower, thereby greatly reducing risks of injuries or accidents.

The mobile surveillance tower of the present invention is adapted to be deployed by a single person at any location in a matter of minutes. The tower can be towed by a standard vehicle. The octagonal cabin provides unobstructed 360-degrees view of your surroundings, thereby enabling operators to minimize or sidestep blind spots.

SUMMARY OF THE INVENTION

In one aspect of the present invention, a trailer assembly having one or more stabilization sensors, each stabilization sensor configured to determine a tilt angle of the trailer assembly relative to its supporting surface; a scissor lift supported by the trailer assembly; and a booth supported by the scissor lift so as to be movable between a collapsed condition and a deployed condition, wherein power to the scissor lift is conditioned on the one or more stabilization sensors determining the trailer assembly has tilt angle relative to its supporting surface of approximately zero degrees.

In another aspect of the present invention, the system includes the following: wherein the trailer assembly further comprises a plurality of stabilizing jacks, and wherein each stabilizing jack has a jack sensor configured to confirm the plurality of stabilizing jacks are extended to withstand uneven loads acting on the booth, wherein confirmation of each jack sensor is a condition to powering to the scissor lift; further including a power cabinet directly connected to the trailer assembly and spaced apart from the scissor lift, wherein the cabinet power controls power for moving the scissor lift to the collapsed condition; further including a control panel in a manned area defined by the booth, wherein the control panel controls power for moving the scissor lift to the collapsed condition, wherein power for moving the scissor lift to the collapsed condition is not conditioned on the confirmation of the jack sensors or the determination of the stabilization sensors, wherein the booth defines an octagonal manned area, wherein the trailer assembly comprises a plurality of jack mount arms movable between a retracted position and an extended position, wherein the extended position a distal end of each jack mount arm operatively associates with one of the stabilizing jacks, wherein the stabilization sensor is an X-Y level sensor.

In yet another aspect of the present invention, a method for providing a mobile surveillance tower includes providing the above-mentioned mobile surveillance tower system, adding a hitch to the trailer assembly, and towing the trailer assembly by way of the hitch.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a mobile surveillance tower system having a booth connected to a trailer assembly by way of a scissors lift, making the booth movable between a collapsed transportation condition and an extended deployed condition. The mobile surveillance tower system provides stabilizing sensors along the trailer assembly so that the power to the scissor lift is conditioned on the stabilizing sensors identifying even ground for stabilizing jacks operatively associated with the trailer assembly. The stabilizing jacks may have their own stabilizing jack sensors for further conditioning power to the scissor lift.

Figure 1:
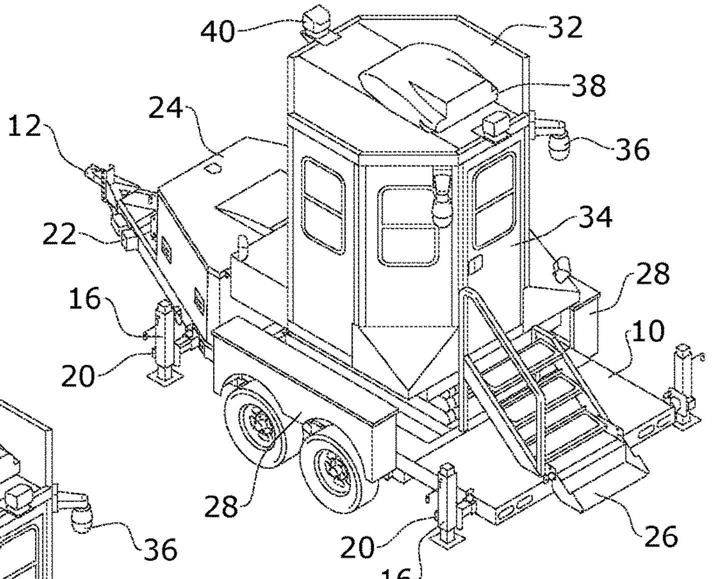
FIG. 1 is a perspective view of an exemplary embodiment of the present invention, shown in a collapsed condition.
Figure 2:
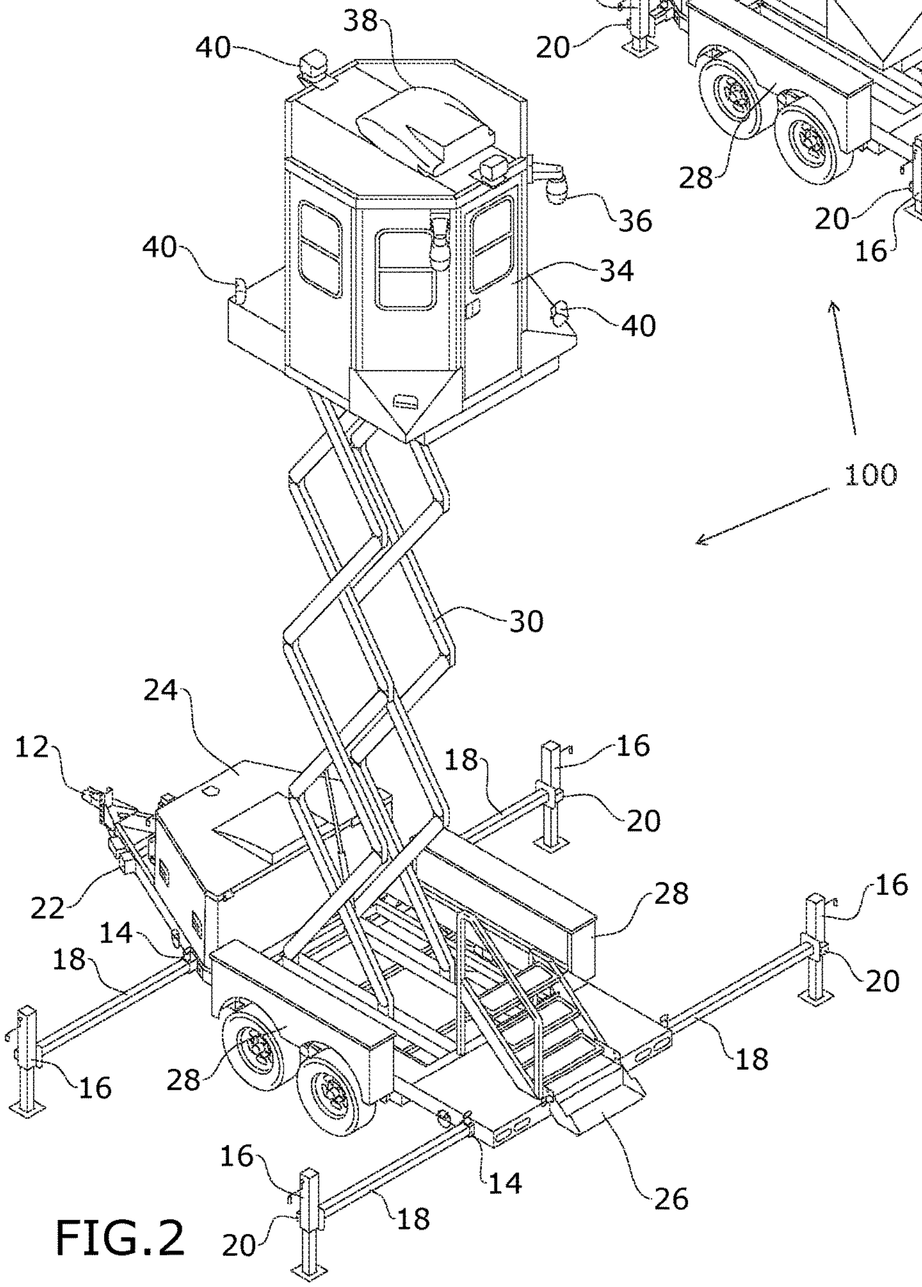
FIG. 2 is a perspective view of an exemplary embodiment of the present invention, shown in a deployed condition.
Figure 3:
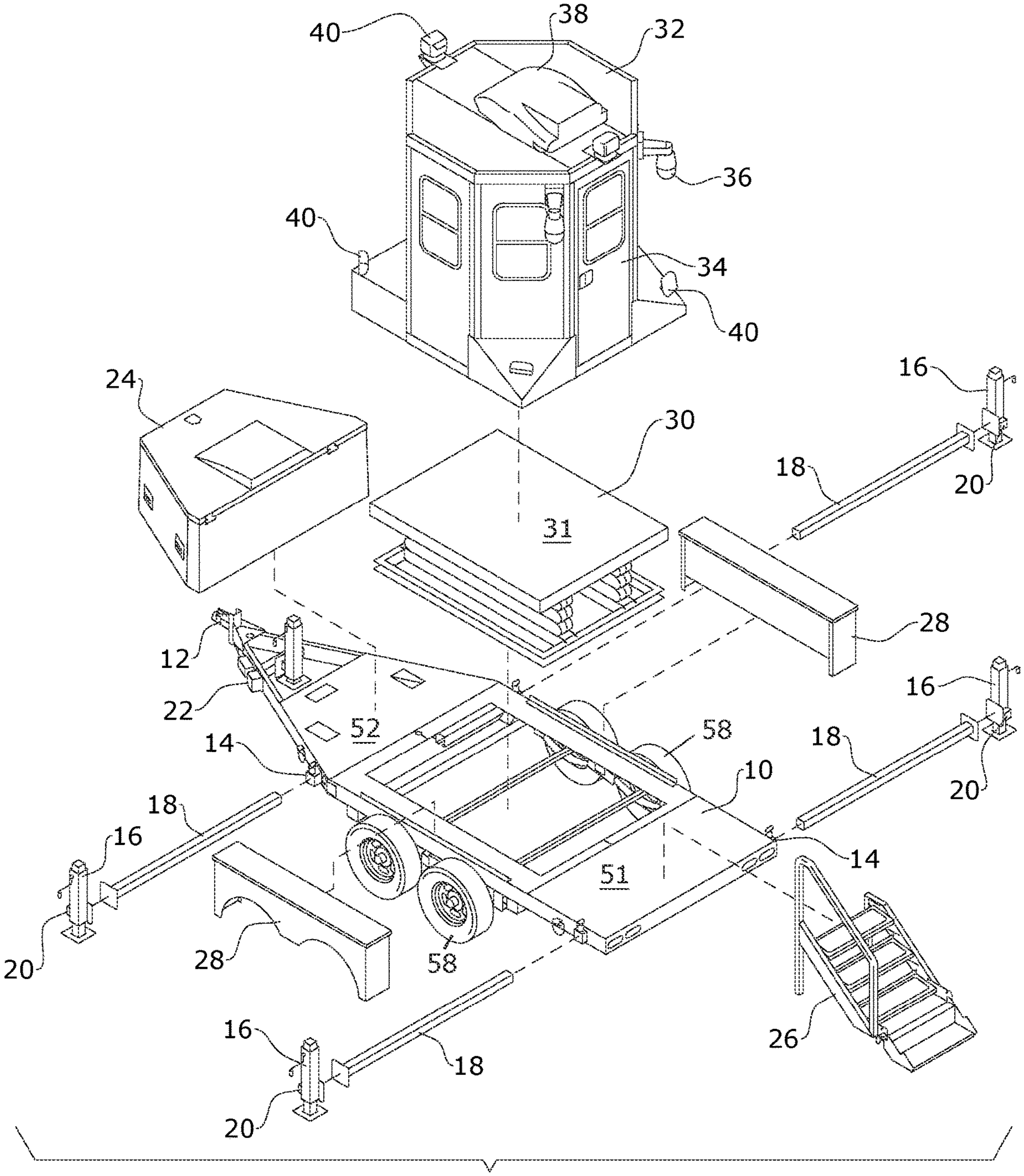
FIG. 3 is an exploded perspective view of an exemplary embodiment of the present invention.
Figure 4:
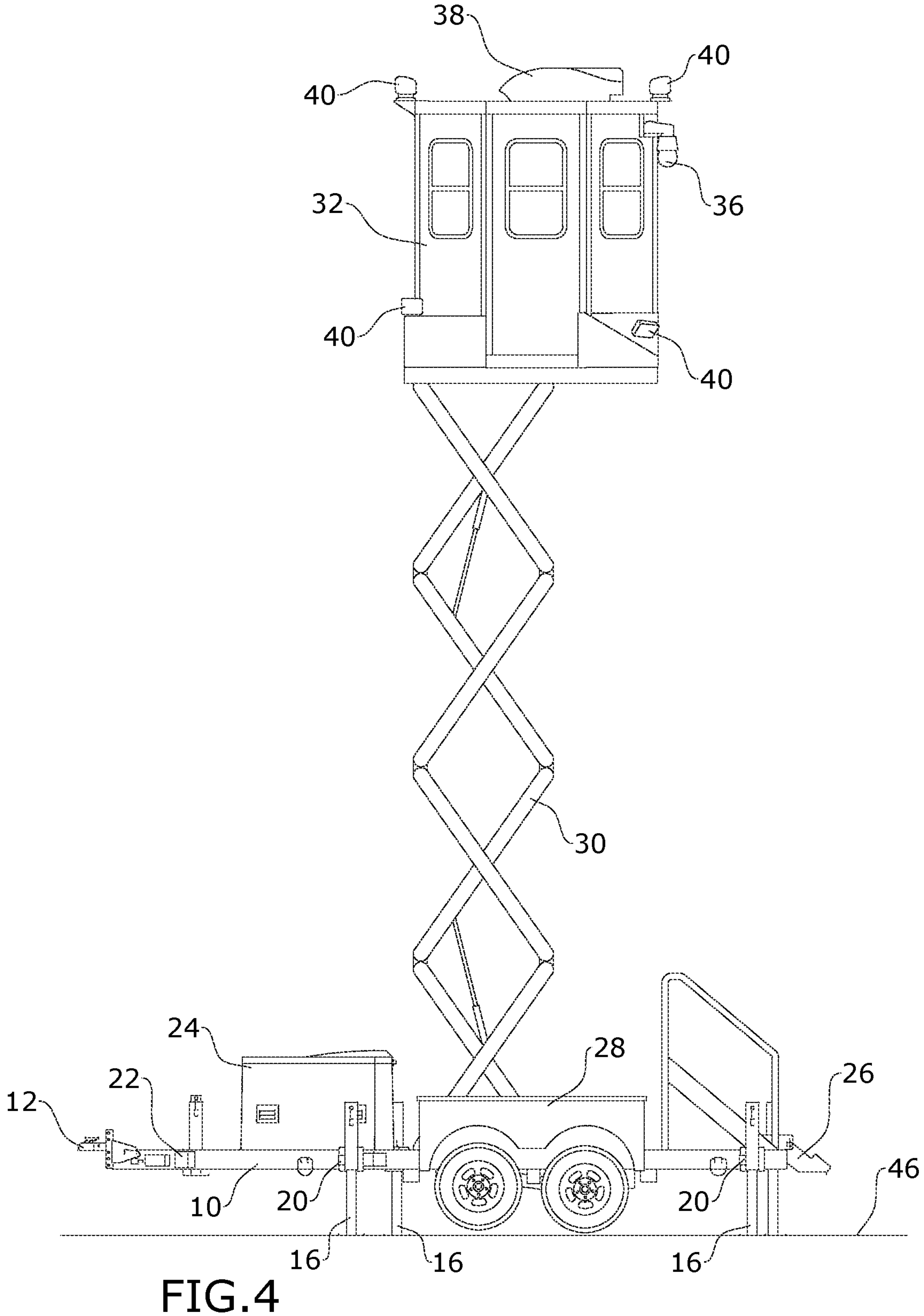
FIG. 4 is a side elevation view of an exemplary embodiment of the present invention, shown in the deployed condition.
Figure 5:
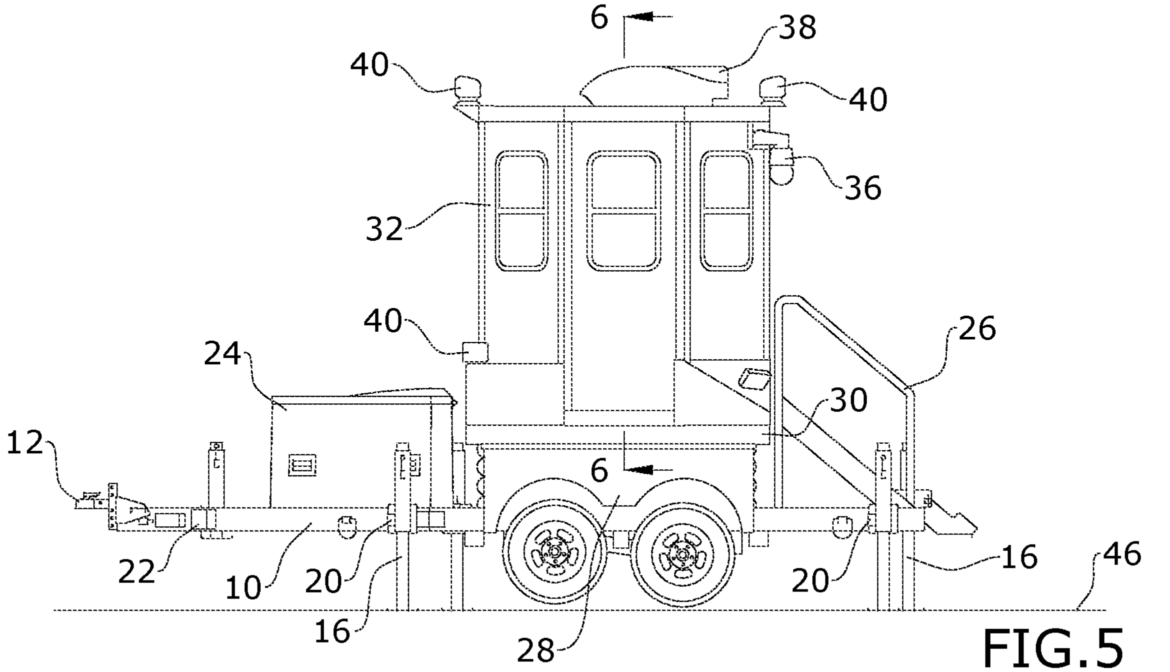
FIG. 5 is a side elevation view of an exemplary embodiment of the present invention, shown in the collapsed condition.
Figure 6:
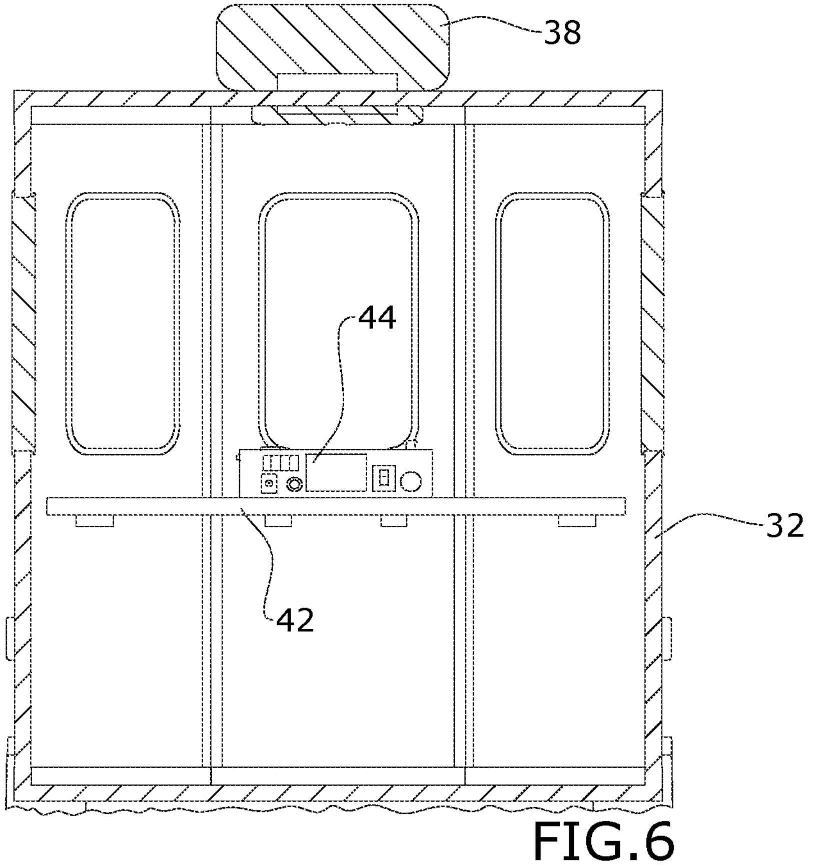
FIG. 6 is a section view of an exemplary embodiment of a booth of the present invention, taken along line 6-6 in FIG. 5.

Referring now to FIGS. 1 through 6, the present invention may include a mobile surveillance tower system 100 having a trailer assembly 10 with a hitch 12. at the front to facilitate transporting the trailer assembly 10 by way of a towing vehicle (not shown). The trailer assembly 10 may be but is not limited to a tandem axle trailer or wheel assembly. The trailer assembly 10 may include a first support surface 51 and a second support surface 52. The first support surface 51 may have wheels 58 along their underside, wherein a portion of the wheels 58 may be shielded from external threats by way of fender cabinets 28. A rear portion of the first support surface 51 may provide a staircase 26 interconnecting the first support surface 51 and the ground 46.

The trailer assembly 10 may include stabilizer jack mounts 14 on opposing ends of the first support surface 51, wherein each stabilizer jack mount 14 either extends between opposing sides of the first support surface 51 or there is a stabilizer jack mount 14 on each side as well as each end of the first support surface 51.

Each stabilizer jack mount 14 may operatively associate with at least one stabilizer arm 18 so that each stabilizer arm 18 is selectively movable between a retracted position and an extended position spaced apart from the trailer assembly 10. A distal end of each stabilizer arm 18 may engage a stabilizer jack 16 operatively associable with the ground 46. Each stabilizer jack 16 may have a jack sensor 20 configured to ensure they are extended to the manufacturer requirement to withstand uneven loads acting on the mobile surveillance tower system 100.

The first support surface 51 may be dimensioned and adapted to support a scissor lift 30. The scissor lift 30 may provide an upper surface 31 dimensioned and adapted to support a systemic booth 32 defining a surveillance control area.

The systemic booth 32 may include a booth door 34 that enables user to access the surveillance control area which is octagonal. The exterior of the systemic booth 32 may provide one or more surveillance cameras 36 and lights 40, as well as an air conditional unit 38. The surveillance control area provides a shelf 42 with a control panel 44.

The scissor lift 30 is selectively movable between a collapsed condition and a deployed condition raising the systemic booth 32 in elevation relative to the ground 46. In the collapsed condition, the staircase 26 interconnecting the first support surface 51 and the ground 46 enable easy access of the manned systemic booth 32.

The second support surface may be dimensioned and adapted to support a power cabinet 24. The front power cabinet 24 enables the storage of batteries, battery chargers, generators, and the fuel tank. These components are what conditionally powers the scissor lift 30 and other components in the manned booth 32 including the surveillance cameras 36. The power cabinet 24 may come with a locking mechanism to prevent theft.

For a safe deployment, the mobile surveillance tower system 100 is equipped with stabilizer jacks 16, jack sensors 20, and X-Y level sensor(s) 22. The manned booth will only deploy, via the scissor lift 30, if all the sensors are within their set ranges. The jack sensors 20 are configured to determine if the stabilizer jacks 16 are extended sufficiently to withstand uneven loading in its current extendable position, and then X-Y level sensor(s) 22 will have to determine an approximate zero-degree tilt angle in order for the scissor lift 30 to activate.

The mobile surveillance tower system 100 is deployed on flat ground 46. The four stabilizer jacks 16 are pulled to their extended position which engages the jack sensor 20. Once the unit is stabilized, the X-Y level sensor 22 is engaged, which sends power to the scissor lift 30. The stabilizers can be adjusted individually to get the X-Y sensors within the acceptable manufacturer set range. The preconditioned selectivity of the power supply is a critical safety feature of the present invention. The mobile surveillance tower system 100 can be powered by batteries, generator, or shore power. All these components may be housed in the power cabinet 24. Once the scissor lift 30 is ready for lift off, the operator has the option to operate the unit on the ground 36 or in the manned booth 32. In the case of an emergency, operators have the option to bring down the manned booth 32 from the ground 46, via the power cabinet 24, or from the elevated state of the deployed condition via the control panel 44 inside the manned booth 32.

If the mobile surveillance tower system 100 is deployed on uneven surface, then X-Y level sensor 22 will cut off power to the scissor lift 30. If any of the four stabilizer jacks 16 are not engaged, the jack sensor 20 will cut off the power to the scissor lift 30. If jack sensors 20 and the X-Y level sensor 22 are engaged, then the scissor lift 30 can raise upward to the deployed condition. For safety purposes, the downward motion is not affected by any sensor.

The mobile surveillance tower system 100 components and stabilizer jacks 16 will have to be fabricated with steel or other sufficiently durable and puncture proof material. Mounts may be added for each sensor. The lift may have to be assembled onto the trailer. The manned booth 32 is then mounted onto the scissor lift 30. Cameras 36 and other components are added to the manned booth 32 based on customer requirements.

The sensors, scissor lift, power cabinet, stabilizer jacks and manned booth are the main components that make the unit function.

Switches can be used in place of sensors to achieve the same functionality. The location of the X-Y level sensors can be relocated from the front to the back of the mobile surveillance tower system 100. The octagonal shape of the manned booth can be square or a circular in design to achieve a similar functionality. Different styles of trailers and axles (single, dual, or triple) can be used to achieve similar capabilities.

Two types of sensors may be required for the safe deployment of the tower. One X-Y level sensor 22 to make sure the trailer is deployed on flat ground, and the jack sensor 20 is required on individual jacks to ensure they are extended to the manufacturer requirement to withstand uneven loads acting on the tower.

During operation, the operator can use surveillance camera(s) 36 to observe their surroundings. Additionally, the present invention can be used for applications that require manned operation such as hunting or construction work.

As used in this application, the term "about" or "approximately" ("approximate") refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length"

means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A mobile surveillance tower system, the system comprising:

a trailer assembly;

on each of both opposing sides of the trailer assembly, two jack mount arms movable in a lateral direction, relative the trailer assembly, between a retracted position and an extended position;

a stabilizing jack at a distal end of each jack mount arm;

a jack sensor operatively associated with each stabilizing jack, wherein each jack sensor is configured to confirm the plurality of stabilizing jacks are sufficiently extended to withstand uneven loads acting on the trailer assembly;

one or more stabilization sensors located along the trailer assembly, each stabilization sensor configured to (i) control power to a scissor lift and (ii) determine a tilt angle of the trailer assembly relative to its supporting surface;

a scissor lift supported by the trailer assembly; and a booth supported by the scissor lift so as to be movable between a collapsed condition and a deployed condition, wherein power to the scissor lift is conditioned on (a) the one or more stabilization sensors determining the trailer assembly has tilt angle relative to its supporting surface of approximately zero degrees and (b) that each jack sensor determines the stabilizing jack is sufficiently extended.

2. The system of claim 1, further comprising a power cabinet directly connected to the trailer assembly and spaced apart from the scissor lift, wherein the cabinet power controls power for moving the scissor lift to the collapsed condition.

3. The system of claim 2, further comprising a control panel in a manned area defined by the booth, wherein the control panel controls power for moving the scissor lift to the collapsed condition.

4. The system of claim 3, wherein the booth defines an octagonal manned area.

5. A method providing a mobile surveillance tower, the method comprising:

providing the mobile surveillance tower system of claim 1;

adding a hitch to the trailer assembly; and towing the trailer assembly by way of the hitch.

6. A mobile surveillance tower system, the system comprising:

a trailer assembly comprising a tandem axle trailer, wherein the tandem axle trailer extends along a longitudinal direction from a hitch end to a stair end;

the trailer assembly having a first support surface adjacent to the stair end, wherein the first support surface is open to an external environment;

a plurality of wheels connected to an underside of the first support surface, wherein the plurality of wheels are shielded by fender cabinets;

a second support surface between the hitch end and the first support surface, wherein the second support surface is coplanar with the first support surface;

a power cabinet supported on the second support surface;

one or more stabilization sensors operatively connected to the hitch area, each stabilization sensor configured to determine a tilt angle of the trailer assembly relative to a supporting surface for the trailer assembly;

a scissor lift supported by the first support surface;

a booth supported by the scissor lift so as to be movable between a collapsed condition and a deployed condition, wherein power from the power cabinet to the scissor lift is conditioned on the one or more stabilization sensors determining the trailer assembly has tilt angle relative to its supporting surface of approximately zero degrees; and a staircase at the stair end configured to interconnect the supporting surface and the booth in the collapsed condition.

7. The system of claim 6, wherein the trailer assembly further comprises a plurality of stabilizing jacks, and wherein each stabilizing jack has a jack sensor configured to confirm the plurality of stabilizing jacks are extended to withstand uneven loads acting on the booth.

8. The system of claim 7, wherein confirmation of each jack sensor is a condition to powering to the scissor lift.

9. The system of claim 8, wherein the power cabinet controls power for moving the scissor lift to the collapsed condition.

10. The system of claim 9, further comprising a control panel in a manned area defined by the booth, wherein the control panel controls power for moving the scissor lift to the collapsed condition.

11. The system of claim 10, wherein the booth defines an octagonal manned area.

12. The system of claim 11, wherein the trailer assembly comprises a plurality of jack mount arms movable between a retracted position and an extended position, wherein in the extended position a distal end of each jack mount arm operatively associates with one of the stabilizing jacks.

13. The system of claim 12, wherein at least one of the one or more stabilization sensors is an X-Y level sensor.

* * * * *